(12) United States Patent
Rebelein et al.

(10) Patent No.: US 8,807,511 B2
(45) Date of Patent: Aug. 19, 2014

(54) FASTENING SYSTEM FOR ADD-ON PARTS ON A VEHICLE HAVING A PROFILE-LIKE CONNECTION PART

(71) Applicant: Mekra Lang GmbH & Co. KG, Fuerth (DE)

(72) Inventors: Christian Rebelein, Petersaurach (DE); Achim Schmidt, Ippesheim (DE); Werner Lang, Ergersheim (DE); Albrecht Popp, Weihenzell (DE)

(73) Assignee: Mekra Lang GmbH & Co. KG, Fuerth (DE)

( * ) Notice: Subject to any disclaimer, the term of this patent is extended or adjusted under 35 U.S.C. 154(b) by 0 days.

(21) Appl. No.: 13/831,701

(22) Filed: Mar. 15, 2013

(65) Prior Publication Data

US 2013/0202347 A1 Aug. 8, 2013

Related U.S. Application Data

(63) Continuation of application No. PCT/EP2011/067792, filed on Oct. 12, 2011.

(51) Int. Cl.
*A47F 7/14* (2006.01)
*B23K 35/02* (2006.01)
*B23K 11/00* (2006.01)
*F16B 17/00* (2006.01)
*B23K 11/14* (2006.01)
*F16B 37/06* (2006.01)
*F16B 5/02* (2006.01)
*B23K 31/02* (2006.01)
*B60R 1/06* (2006.01)
*B23K 9/20* (2006.01)
*B60R 1/00* (2006.01)

(52) U.S. Cl.
CPC ........... *F16B 17/002* (2013.01); *B23K 35/0288* (2013.01); *B23K 11/0053* (2013.01); *F16B 17/00* (2013.01); *B60R 1/00* (2013.01); *B23K 11/14* (2013.01); *F16B 37/061* (2013.01); *B23K 2201/006* (2013.01); *F16B 5/025* (2013.01); *B23K 31/02* (2013.01); *B60R 1/06* (2013.01); *B23K 9/201* (2013.01)
USPC .................... 248/475.1; 248/222.14; 359/871

(58) Field of Classification Search
CPC ............ B60R 1/06; B60R 1/025; B60R 1/08; B60R 1/00; F16B 17/00; F16B 37/061; F16B 5/025; F16B 19/00; F16B 17/002; B23K 35/0288; B23K 11/0053; B23K 111/14; B23K 2201/006; B23K 31/02
USPC ......... 248/222.14, 224.7, 466, 476–478, 900; 359/871, 872
See application file for complete search history.

(56) References Cited

U.S. PATENT DOCUMENTS 1,493,250 A * 5/1924 Drummond ................. 296/96.11
2,127,685 A 8/1938 Greulich ....................... 219/107

(Continued)

FOREIGN PATENT DOCUMENTS

DE 1159791 A 12/1963
DE 7729370 U 1/1978

(Continued)

OTHER PUBLICATIONS

Search report dated Jul. 12, 2011 of the Germany Patent Office in the priority German patent application 102010048737.6.

*Primary Examiner* — Gwendolyn W Baxter
(74) *Attorney, Agent, or Firm* — Imperium Patent Works; Darien K. Wallace

(57) ABSTRACT

A fastening system for add-on parts to vehicles allows the add-on parts to be easily installed and removed. The fastening system includes a connection part that lies against the vehicle and the add-on part, which includes a base. The connection part is designed as a profiled element whose outer surface corresponds to the outer surface of a prism having a cross section of a regular polygon with at least one interior angle deviating from 90°. The base has a trapezoidal groove with opposing surfaces on opposing sides of a base surface that are arranged at an angle from each other. The two opposing surfaces lie flush with wiggle-free engagement against two lateral surfaces of the connection part. A hole extends through the base symmetrically with respect to the groove. A connecting element is inserted through an opening in the base and engages in a receptacle of the connection part.

19 Claims, 2 Drawing Sheets

(56) References Cited

U.S. PATENT DOCUMENTS

| | | | | |
|---|---|---|---|---|
| 3,784,149 A | * | 1/1974 | Brudy | 248/478 |
| 4,186,905 A | * | 2/1980 | Brudy | 248/478 |
| 4,523,735 A | * | 6/1985 | Beck et al. | 248/476 |
| 4,623,115 A | * | 11/1986 | Brester | 248/479 |
| 5,687,017 A | * | 11/1997 | Katoh et al. | 359/216.1 |
| 6,910,781 B2 | * | 6/2005 | Spychalla et al. | 359/872 |
| 7,261,272 B2 | * | 8/2007 | Courbon | 248/475.1 |

FOREIGN PATENT DOCUMENTS

| | | |
|---|---|---|
| EP | 1731368 | 5/2005 |
| JP | 5042433 | 2/1993 |
| JP | 8338414 | 12/1996 |
| JP | 2003117660 | 4/2003 |
| JP | 2009154792 | 7/2009 |
| WO | WO 2012/049203 | 4/2012 |

* cited by examiner

FASTENING SYSTEM FOR ADD-ON PARTS ON A VEHICLE HAVING A PROFILE-LIKE CONNECTION PART

CROSS REFERENCE TO RELATED APPLICATION

This application is filed under 35 U.S.C. §111(a) and is based on and hereby claims priority under 35 U.S.C. §120 and §365(c) from International Application No. PCT/EP2011/067792, filed on Oct. 12, 2011, and published as WO 2012/049203 A1 on Apr. 19, 2012, which in turn claims priority from German Application No. 102010048737.6, filed on Oct. 16, 2010, in Germany. This application is a continuation-in-part of International Application No. PCT/EP2011/067792, which is a continuation of German Application No. 102010048737.6. International Application No. PCT/EP2011/067792 is pending as of the filing date of this application, and the United States is an elected state in International Application No. PCT/EP2011/067792. This application claims the benefit under 35 U.S.C. §119 from German Application No. 102010048737.6. The disclosure of each of the foregoing documents is incorporated herein by reference.

TECHNICAL FIELD

The present invention relates to a fastening system for zero-play engagement of add-on parts to a vehicle. In addition, the invention relates to a vehicle that includes a device for indirect view, such as a mirror, which is installed on the vehicle by means of such a fastening system.

BACKGROUND

Solutions are known in which the base of an add-on part to a vehicle is screwed directly onto the vehicle by means of a screw joint. Solutions are furthermore known to connect the base of the add-on part directly to the vehicle by means of a welded connection or also an adhesive joint.

Solutions in which the base of the component is to be directly screwed onto the vehicle have a disadvantage insofar as they require costly preparation of the vehicle. The necessary threads on the vehicle must be provided in order to hold the screws, for example. To obtain a wiggle-free, zero-backlash centering, this moreover requires precise matching of the geometry of the contact surface of the base and that of the add-on part to be fastened.

Solutions, in which the base of the add-on part is to be directly attached to the vehicle by means of a welded connection have disadvantages because an add-on part that is attached in this manner can no longer be non-destructively removed from the vehicle. Such type of solution furthermore requires the weldability of the base of the add-on part to be fastened. In addition, it is necessary for the base of the add-on part to be prepared for welding, which is costly, so that favorable contact surfaces for the application of the welding seam result after the base is put against the vehicle.

The object of the invention therefore is to provide a fastening system for add-on parts on vehicles that allows add-on parts to be attached to the vehicles in a simple manner. The object of the invention moreover is to provide a vehicle with such a fastening system.

SUMMARY

The invention relates to a system for fastening add-on parts to vehicles and allows the add-on parts to be easily installed on and removed from the vehicles. The invention further relates to a vehicle provided with such a fastening system. The fastening system comprises a connection part that lies against the vehicle and a base that is connected to the add-on part. The connection part is designed as a profiled element whose exterior outer surface corresponds at least in some sections to the outer surface of a prism having a cross section of a regular polygon with at least one interior angle deviating from 90°. The base includes a trapezoidal groove having opposing surfaces that are arranged at an angle from each other and that are connected to each other by a base surface. The two opposing surfaces lie flush against two lateral surfaces of the connection part that are not directly adjacent to each other. A hole extends through the base symmetrically with respect to the groove and centrally through the base surface. The connection part has a receptacle in which a connecting element engages. The connecting element is inserted through an opening in the base.

A system for fastening an add-on part to a vehicle includes a base, a connecting element and a connection part. The base has a groove with a first side surface, a second side surface and a base surface. Each of the first and second side surfaces is adjacent to the base surface. The connecting element passes through the base. The connection part has a receptacle, an inner surface, an outer surface, a first adjacent surface and a second adjacent surface. The cross section of the connection part is a regular polygon with at least one interior angle deviating from 90°. The inner surface and the outer surface correspond to opposite sides of the polygon. In one embodiment, the polygon is a hexagon. Each of the first and second adjacent surfaces is adjacent to the outer surface. The first adjacent surface is flush with the first side surface, and the second adjacent surface is flush with the second side surface. Each of the first side surface, the second side surface, the first adjacent surface and the second adjacent surface is planar.

The base is part of the add-on part to the vehicle. In one embodiment, the add-on part is a device for providing an indirect view from the vehicle, such as a side mirror. The inner surface of the connection part lies flush against a surface of the vehicle, and the connection part is welded to the vehicle. The connection part can have a hollow tubular profile or a solid profile. A gap exists between the outer surface of the connection part and the base surface of the base. The receptacle is adapted to receive the connecting element. In one embodiment, the connecting element is a threaded bolt, and the receptacle is threaded. In another embodiment, the connecting element makes a frictional connection with the receptacle.

In another embodiment, a system includes a vehicle, a base, a connecting element and a connection part. The base has a groove with a first side surface, a second side surface and a base surface. Each of the first and second side surfaces is adjacent to the base surface. The connecting element passes through the base. The connection part has a receptacle, an inner surface, an outer surface, a first adjacent surface and a second adjacent surface.

The inner surface of the connection part lies flush against a surface of the vehicle, and the connection part is welded to the vehicle. The welding seams are disposed in grooves formed between the surface of the vehicle and third and fourth adjacent surfaces that are both adjacent to the inner surface. Each of the first and second adjacent surfaces is adjacent to the outer surface. The connection part has a cross section of a regular polygon. The first adjacent surface is flush with the first side surface, and the second adjacent surface is flush with the second side surface. Each of the first side surface, the second side surface, the first adjacent surface and the second adjacent surface is planar. The receptacle is adapted to receive the connecting element.

Other embodiments and advantages are described in the detailed description below. This summary does not purport to define the invention. The invention is defined by the claims.

BRIEF DESCRIPTION OF THE DRAWINGS

Further particulars, features, and advantages of the invention result from the following description of an exemplary embodiment represented in the drawings, as follows.

DETAILED DESCRIPTION

Figure 1:
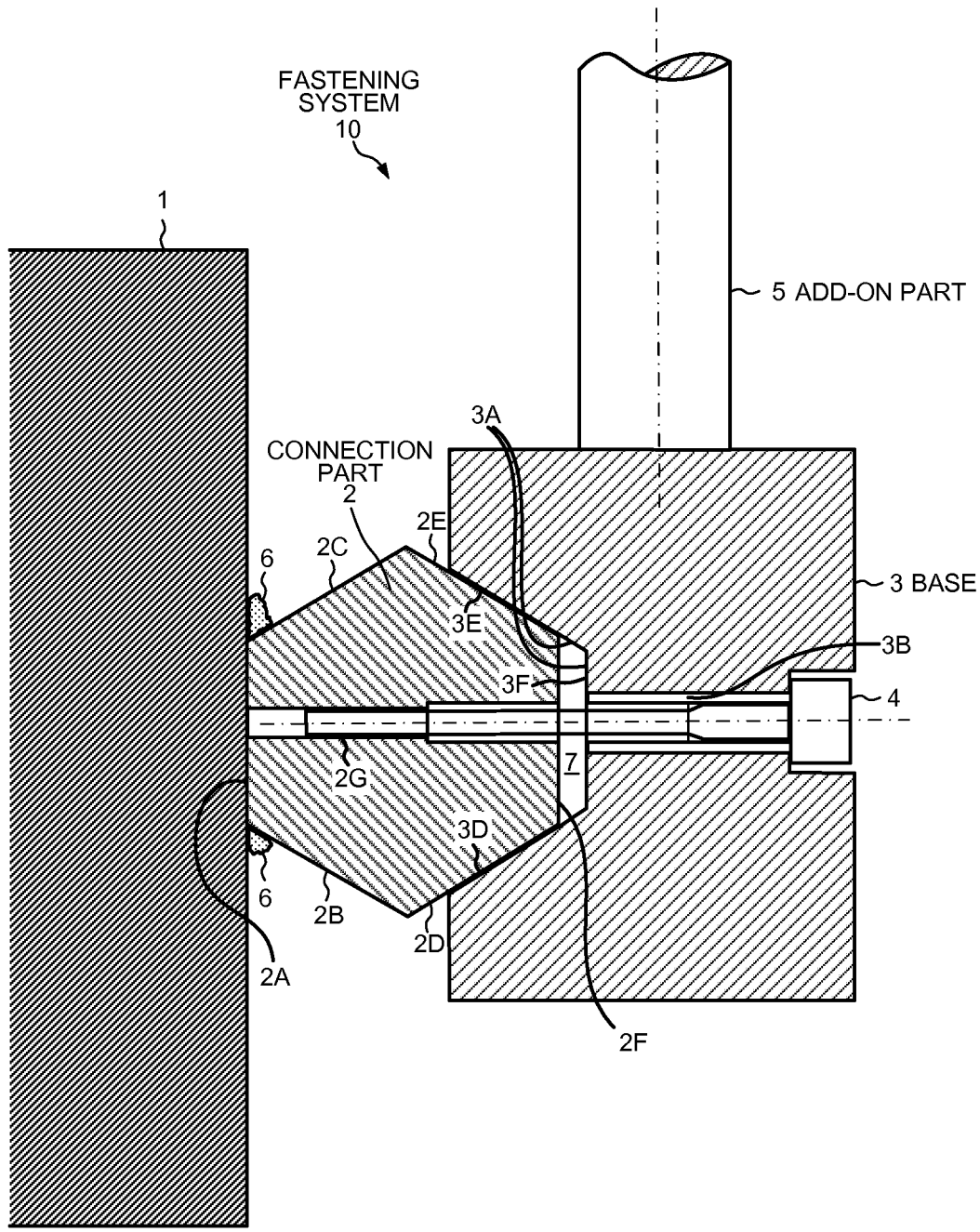
FIG. 1 is a cross-section of the exemplary embodiment of the fastening system.

Reference will now be made in detail to some embodiments of the invention, examples of which are illustrated in the accompanying drawings.

The fastening system comprises a connection part that lies against the vehicle and a base, which is connected to an add-on part. The connection part is designed as a profiled element whose outer surface corresponds at least in some sections to the outer surface of a prism having a cross section of a regular polygon with at least one interior angle deviating from 90°. The connection part furthermore comprises at least one receptacle for receiving a connecting element that is accessible from a lateral surface. The connection part lies against the vehicle with one lateral surface. In this manner, grooves are formed between the vehicle and the lateral surfaces of the connection part adjacent to the lateral surface that is in contact with the vehicle. A welding seam can be laid directly into each groove. The base of the add-on part comprises a trapezoidal groove with lateral surfaces against which the surfaces of the connection part can at least partially be laid flush. The base moreover has at least one continuous opening through which a connection means can be inserted.

According to a preferred embodiment, the connection part is initially laid against the vehicle with one lateral surface for fastening the add-on part onto the vehicle. Welding seams are furthermore arranged in the resulting grooves between the vehicle surface and the adjacent lateral surfaces of the add-on part lying against the lateral surface. The base of the add-on part is now attached to the connection part such that the side surfaces of the trapezoidal groove lie against the lateral surfaces of the connection part and that the at least one opening in the base and the at least one receptacle for a connection means are lying superposed in the connection part. The at least one connection means will now be inserted through the at least one opening in the base and brought into a frictional and/or form closure type connection with the at least one receptacle.

Because the side surfaces of the trapezoidal groove are reciprocally arranged at an acute angle in the base, and the lateral surfaces of the connection part lie flush against them, this produces a wiggle-free, no clearance centering of the base on the connection part by means of the prism surfaces in the groove.

In a particularly preferred embodiment, the connection part is shaped such that its outer surface corresponds at least in some sections to the outer surface of a prism having the cross-section of a regular hexagon. The advantage of this embodiment is the easy availability of the necessary standard rod stock. In this way, the connection part can be produced in a very favorable manner by cutting off a section of the standardized normal products (standard rod stock) that are commercially available. The process of introducing the necessary thread into the connection part and the cutting off of the rod stock can be simply and easily automated.

The simple method of being able to produce the connection between the vehicle and the add-on part is advantageous. In this context, the inventive development of the outer surface of the exterior of the connection part plays a supporting role: the surfaces facing the vehicle are shaped such that a very favorable groove for applying a welding seam forms between the vehicle and the connection part without additional effort. No additional expense is thus necessary in having to prepare for welding. In addition, no vehicle-related contour adaptations on the connection part are necessary so that the engagement with the connection part can be realized on almost any metal surface of a vehicle. The surfaces of the connection part facing away from the vehicle are designed such that a very advantageous centering of the base of the add-on part is enabled by means of a prism. This type of centering proves to be robust with respect to deviations in manufacturing tolerances.

Figure 2:
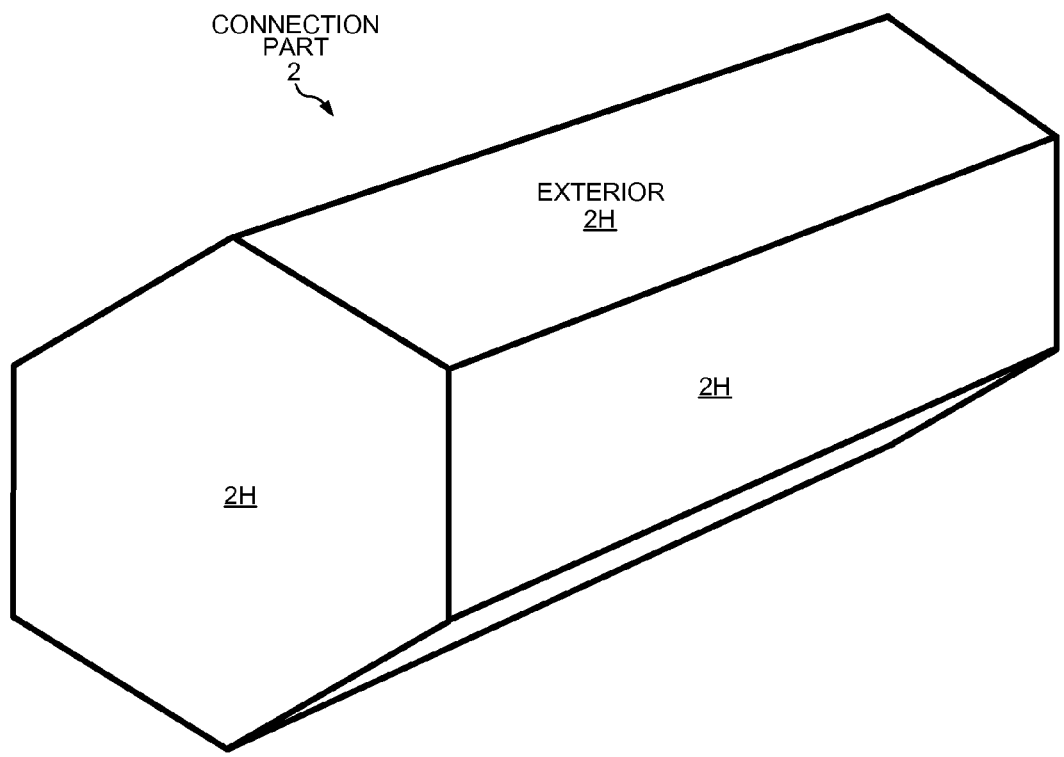
FIG. 2 is a perspective illustration of the connection part.

FIG. 1 shows an exemplary embodiment of a fastening system 10 that includes a connection part 2 that is firmly connected to a surface of a vehicle 1. The fastening system 10 also includes a base 3 that is part of an add-on part 5. The add-on part 5 is a device for indirect view, for example, a side mirror of the vehicle 1. The base 3 of the add-on part 5 can be connected with a vehicle mirror rigidly or by means of a latching joint. The connection part 2 shown in FIG. 2 is shaped as a prism with a regular hexagon as a cross sectional end and thus comprises six lateral surfaces 2A, 2B, 2C, 2D, 2E and 2F. The six lateral surfaces together form the outer surface of the exterior 2H of the connection part 2. Surface 2A is an inner surface and lies flush against a surface of the vehicle 1. Each of the first adjacent surface 2D and the second adjacent surface 2E is adjacent to the outer surface 2F.

The connection part 2 lies against the vehicle 1 with inner lateral surface 2A. In this manner, grooves are formed between the vehicle 1 and the lateral surfaces 2B and 2C that are disposed adjacent to the lateral surface 2A. Welding seams 6 is laid directly into the grooves between the vehicle 1 and the lateral surfaces 2B and 2C.

Figure 3:
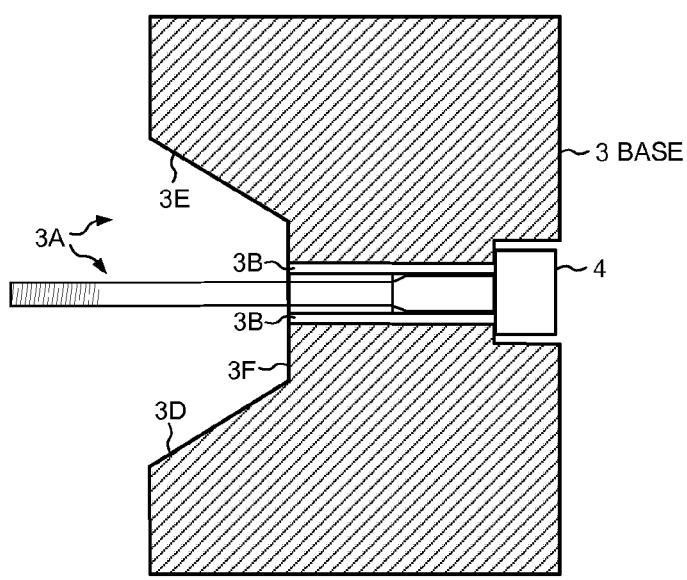
FIG. 3 is a more detailed view of the base of the add-on part.

FIG. 3 is a more detailed view of base 3 showing a trapezoidal groove 3A. The groove 3A of the add-on part 5 has a first side surface 3D and a second side surface 3E that are reciprocally arranged at an angle and adjoin one another through a base surface 3F of groove 3A. The two side surfaces 3D and 3E lie flush against two not completely overlapping lateral surfaces 2D and 2E, respectively, of the connection part 2, as shown in FIG. 1. Thus, the first adjacent surface 2D is flush with the first side surface 3D, and the second adjacent surface 2E is flush with the second side surface 3E. The base 3 with the two side surfaces 3D and 3E is shaped such that a gap 7 remains between the outer lateral surface 2F of the connection part 2 and the base surface 3F of the base 3. In this way, the connection between the connection part 2 and the base 3 has zero-backlash, is free from play, and is self-centering. The base 3 is penetrated centrally through the base surface 3F by a bore 3B that is symmetrically located in groove 3A. The connection part 2 includes a threaded bore 2G which extends centrally through the two opposite lateral surfaces 2A and 2F. The threaded bore 2G acts as a receptacle for a connecting element 4, such as a bolt or screw. The add-on part 5 and/or the base 3 are attached to the connection part 2 such that the bore 3B and the threaded bore 2G are coaxially aligned. The connecting element 4 is inserted into the bore 3B and is screwed into the threaded bore 2G. In this way, the add-on part 5 is attached detachably to the vehicle 1 in a simple manner.

LIST OF REFERENCE SYMBOLS 1 vehicle
2 connection part
2A, 2B, 2C, 2D, 2E, 2F lateral surfaces of part 2
2G threaded bore receptacle
3 base
3A groove
3B bore
3D, 3E side surfaces of groove 3A
3F base surface of groove 3A
4 connecting element
5 add-on part
6 welding seams
7 gap Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A system for fastening an add-on part to a vehicle, comprising:
   a base with a groove, wherein the groove has a first side surface, a second side surface and a base surface, wherein each of the first and second side surfaces is adjacent to the base surface;
   a connecting element, wherein the connecting element passes through the base; and
   a connection part having a receptacle, an inner surface, an outer surface, a first adjacent surface and a second adjacent surface, wherein the inner surface is opposite the outer surface, wherein each of the first and second adjacent surfaces is adjacent to the outer surface, wherein the receptacle is adapted to receive the connecting element, wherein the connection part has a cross section of a regular polygon with at least one interior angle deviating from 90°, wherein the first adjacent surface is flush with the first side surface, wherein the second adjacent surface is flush with the second side surface, and wherein each of the first side surface, the second side surface, the first adjacent surface and the second adjacent surface is planar.

2. The system of claim 1, wherein a gap exists between the outer surface and the base surface.

3. The system of claim 1, wherein the base is part of the add-on part.

4. The system of claim 3, wherein the add-on part includes a mirror.

5. The system of claim 1, wherein the add-on part is a device for providing an indirect view from the vehicle.

6. The system of claim 1, wherein the receptacle is threaded.

7. The system of claim 1, wherein the connecting element is a threaded bolt.

8. The system of claim 1, wherein the connecting element makes a frictional connection with the receptacle.

9. The system of claim 1, wherein the inner surface lies against the vehicle.

10. The system of claim 1, wherein the inner surface lies flush against a surface of the vehicle, and wherein the connection part is welded to the vehicle.

11. The system of claim 1, wherein the regular polygon is a hexagon.

12. The system of claim 1, wherein the connection part has a hollow tubular profile.

13. The system of claim 1, wherein the connection part has a solid profile.

14. A system comprising:
   a base with a groove, wherein the groove has a first side surface, a second side surface and a base surface, wherein each of the first and second side surfaces is adjacent to the base surface;
   a connecting element, wherein the connecting element passes through the base;
   a connection part having a receptacle, an inner surface, an outer surface, a first adjacent surface and a second adjacent surface; and
   a vehicle, wherein the inner surface lies flush against a surface of the vehicle, wherein each of the first and second adjacent surfaces is adjacent to the outer surface, wherein the receptacle is adapted to receive the connecting element, wherein the connection part has a cross section of a regular polygon, wherein the first adjacent surface is flush with the first side surface, wherein the second adjacent surface is flush with the second side surface, and wherein each of the first side surface, the second side surface, the first adjacent surface and the second adjacent surface is planar.

15. The system of claim 14, wherein the connection part is welded to the vehicle.

16. The system of claim 15, wherein welding seams are disposed in grooves formed between the surface of the vehicle and third and fourth adjacent surfaces that are both adjacent to the inner surface.

17. The system of claim 14, wherein the regular polygon has at least one interior angle deviating from 90°.

18. The system of claim 14, wherein the regular polygon is a hexagon.

19. A system comprising:
   an add-on part with a mirror and a base, wherein the base has a groove with a first side surface, a second side surface and a base surface, wherein each of the first and second side surfaces is adjacent to the base surface; and
   means for attaching the add-on part to an outer surface of a vehicle by creating a wiggle-free engagement between the means and the first and second side surfaces, wherein the means has a cross section of a regular polygon, and wherein the means is welded to the surface of the vehicle.

* * * * *